United States Patent [19]

Ekberg et al.

[11] Patent Number: 4,946,602
[45] Date of Patent: Aug. 7, 1990

[54] METHOD OF CLEANING FILTER DISCS IN A SUCTION DRYER USING ULTRASONIC VIBRATION

[75] Inventors: Bjarne Ekberg, Turku; Göran Norrgård, Parainen, both of Finland

[73] Assignee: Valmet Paper Machiney Inc., Finland

[21] Appl. No.: 278,536

[22] PCT Filed: Feb. 29, 1988

[86] PCT No.: PCT/FI88/00032
§ 371 Date: Nov. 21, 1988
§ 102(e) Date: Nov. 21, 1988

[87] PCT Pub. No.: WO88/07887
PCT Pub. Date: Oct. 20, 1988

[30] Foreign Application Priority Data

Apr. 16, 1987 [FI] Finland ............................ 871706

[51] Int. Cl.⁵ ............................................. B01D 33/24
[52] U.S. Cl. ................................. 210/785; 210/384; 210/393; 210/394; 210/408; 134/1; 134/22.14
[58] Field of Search ............... 210/748, 785, 384, 393, 210/394, 408, 412, 345, 346, 347; 134/1, 18, 21, 22.14, 147

[56] References Cited

U.S. PATENT DOCUMENTS

| | | | |
|---|---|---|---|
| 1,042,295 | 10/1912 | Trent | 210/393 |
| 1,259,139 | 3/1918 | Salisbury | 210/393 |
| 1,612,873 | 1/1927 | Mauss | 210/393 |
| 1,649,581 | 11/1927 | Genter et al. | 210/393 |
| 1,700,772 | 2/1929 | McCaskell | 210/785 |
| 2,000,777 | 5/1935 | Minton et al. | 210/785 |
| 2,197,610 | 4/1940 | Fedeler, Jr. | 210/748 |
| 2,406,065 | 8/1946 | Dickinson et al. | 210/408 |
| 2,460,280 | 2/1949 | Finney | 210/393 |
| 2,963,158 | 12/1960 | Jung | 210/748 |
| 3,117,768 | 1/1964 | Carlin | 134/1 |
| 3,193,105 | 7/1965 | Putnam | 210/331 |
| 3,331,512 | 7/1967 | Vore | 210/487 |
| 3,472,002 | 10/1969 | Brown et al. | 210/393 |
| 3,489,679 | 1/1970 | Davidson et al. | 210/785 |
| 3,627,139 | 12/1971 | Burtsev | 210/393 |
| 3,707,230 | 12/1972 | Davidson | 210/785 |
| 3,919,088 | 11/1975 | Doncer et al. | 210/408 |
| 3,997,447 | 12/1976 | Breton et al. | 210/393 |
| 4,032,442 | 6/1977 | Peterson | 210/393 |
| 4,166,034 | 7/1979 | Bodine | 210/748 |
| 4,346,011 | 8/1982 | Brownstein | 210/785 |
| 4,582,077 | 4/1986 | Gabriel, et al. | 134/94 |
| 4,698,156 | 10/1987 | Bumpers | 210/393 |

FOREIGN PATENT DOCUMENTS

1168580  10/1969  United Kingdom .

Primary Examiner—Richard V. Fisher
Assistant Examiner—Cynthia L. Nessler
Attorney, Agent, or Firm—Steinberg & Raskin

[57] ABSTRACT

Method in a suction dryer (10), which comprises a basin (12) for a suspension to be suction-dried, in connection with which basin one or several filter-plate discs (14a) revolve, onto whose faces a filtrate cake is gathered and dewatered by the effect of a suction flow passing through the filter plates (14a), the said filtrate cake/-cakes being scraped or otherwise detached from the faces of the filter plates (14a). For the purpose of cleaning the porous structure and faces of the filter plates (14a), an ultrasonic detector or detectors (30) are provided in connection with the basin (12) for the suspension to be filtered, to which detectors an electric power of ultrasonic frequency is fed from an ultrasonic generator (32). For the time of the cleaning intensified by ultrasound, the suspension basin (12) is filled with a connecting and cleaning liquid, e.g. water. The filter-plate discs (14) are rotated in the connecting and cleaning liquid by means of the same equipment (14, 13, 18) by means of which the rotating of the filter-plate discs (14) takes place in connection with the suction drying.

11 Claims, 2 Drawing Sheets

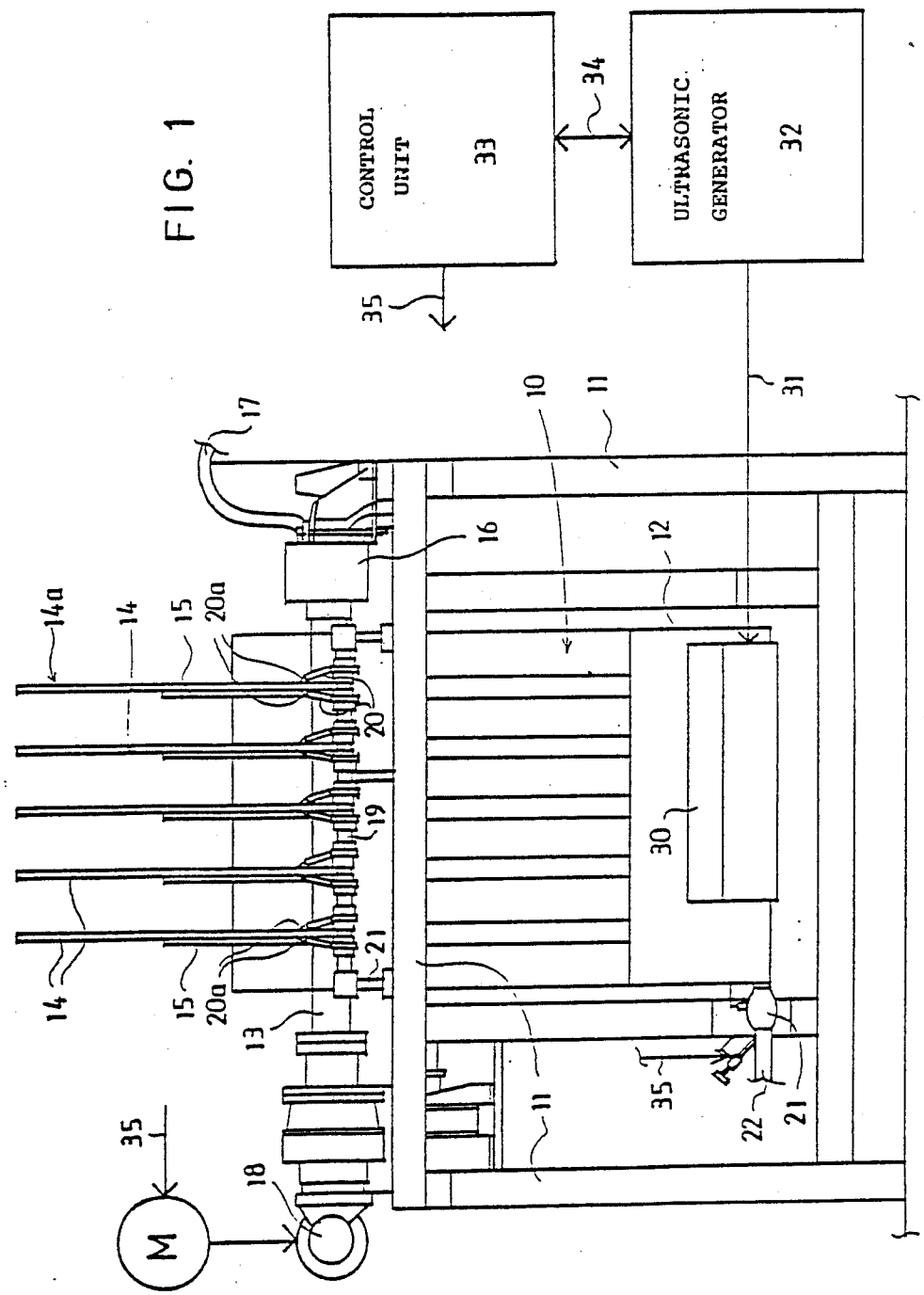

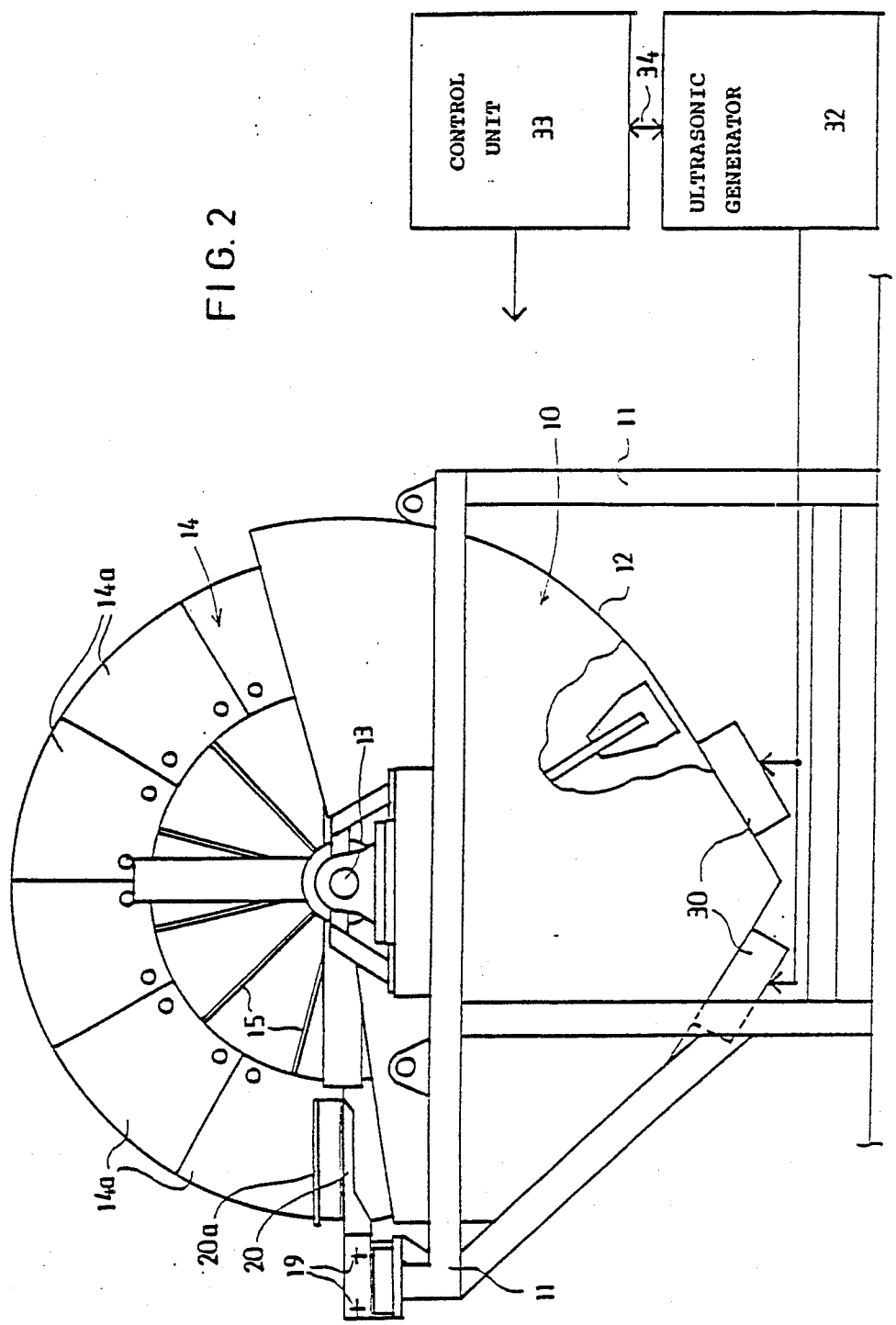

METHOD OF CLEANING FILTER DISCS IN A SUCTION DRYER USING ULTRASONIC VIBRATION

BACKGROUND OF THE INVENTION

The invention concerns a method in a suction dryer which comprises a basin for the suspension to be suction-dried, in connection with which basin one or several disc-shaped components revolve, which consist of filter plates, onto the faces of which a filtrate cake is gathered and dewatered by the effect of a suction flow passing through the filter plates, the filtrate cake/cakes being scraped or otherwise detached from the face or faces of the filter plates.

In the prior art, various suction dryers are known which comprise filter discs composed of finely porous filter plates. The discs are rotated in the suspension to be dewatered, and by the effect of suction, a filtered cake is gathered on the plane faces of the filter plates, which cake is scraped off the faces of the filter plates.

With respect to recent developments of the suction dryers concerned, reference is made to the applicant's earlier Finnish Patent Applications Nos. 870706, 870707, and 871312, reference being made to the constructional details described in the applications.

The usually ceramic filter plates have a tendency to be blocked, because their pore structure is successively filled with finely divided material. In a way known in prior art, attempts have been made to clean the filter plates by passing cleaning liquid through the same in the direction opposite to the circulation of the liquid to be removed, said cleaning liquid usually consisting of water. Moreover, various brush devices have been used for outside cleaning of filter plates.

However, with these prior-art methods and devices, it has not been possible to retain the permeability of the filter plates for a sufficiently long period of time. Instead it has been necessary to replace the filter plates unnecessarily frequently, in relation to their durability in other respects, which increases the filter costs substantially and causes standstills in the process.

SUMMARY OF THE INVENTION

The general object of the present invention is to provide improvements in the drawbacks discussed above.

A particular object of the present invention is to provide such a method for the cleaning of suction filter plates wherein no substantial alterations have to be made to the suction filter device itself and which cleaning method can be used smoothly when required, at suitable intervals, so that the natural functions and embodiments of equipment of the suction dryer can be utilized efficiently in the cleaning.

With the above objects in view the method in accordance with the invention is mainly characterized in
    that for the purpose of cleaning the porous structure and faces of the filter plates, an ultrasonic detector or detectors are provided in connection with the basin for the suspension to be filtered, to which detectors an electric power of ultrasonic frequency is fed out from an ultrasonic generator,
    during the time of the cleaning intensified by ultrasound, the suspension basin is filled with a connecting and cleaning liquid, preferably water, and
    the filter-plate discs are rotated in the connecting and cleaning liquid by means of the same equipment by means of which the rotating of the filter-plate discs takes place in connection with the suction drying.

BRIEF DESCRIPTION OF THE DRAWINGS

In the following, the invention will be described in detail with reference to an exemplifying embodiment of the invention illustrated in the figures in the accompanying drawing, to whose details the invention is by no means strictly confined.

FIG. 1 is a schematic side view of a suction dryer arranged to be cleaned by means of the method in accordance with the invention.

FIG. 2 shows the same suction dryer of FIG. 1, viewed from the end of the same.

DESCRIPTION OF PREFERRED EMBODIMENTS

The suction dryer 10 shown in FIGS. 1 and 2 comprises a frame part 11 and a suspension basin 12 arranged on the frame, the suspension to be dewatered, such as dressed metal ore, peat suspension, or equivalent, being passed into said basin. A horizontal shaft 13 is fitted so as to revolve on the frame part 11, said shaft being driven by a motor M by the intermediate of a worm gear 18. To the shaft 13, filter discs 14 in a vertical plane are fixedly mounted, said discs being provided with ceramic filter plates 14a. The interior spaces in the filter plates 14a of the filter discs 14 communicate via radial suction tubes 15 with suction tubes placed in connection with the shaft 13, said suction tubes communicating with a distributor head 16, which distributes the effect of negative pressure introduced through the suction tube 17 to the filter plates 14a of the discs 14 that are submerged in the suspension present in the basin 12 or on whose faces filtered cakes are being dewatered.

The dewatered cakes are scraped off the faces of the plates 14a in the filter discs 14 by means of doctors 20, whose blades 20a are placed on opposite the other, as is shown in FIG. 1, on both of the opposite active faces of the filter plates 14a. The blades 20a of the doctors 20 are connected by means of intermediate arms to guides 19, by whose intermediate the doctor blades 20, placed in pairs one opposite the other, are loaded with an appropriate force.

In connection with the suspension basin 12, a cleaning system in accordance with the invention is provided for the filter plates 14a of the discs 14, preferably ceramic, finely porous filter plates. The cleaning system includes ultrasonic detectors 30, which are permanently connected to the sub-bottom of the basin 12 and to which electric power is passed by the intermediate of a conductor 31 from an ultrasonic generator 32. The ultrasonic generator 32 and the operation of the entire system are controlled by the control unit 33 by the intermediate connector 34. From the control unit 33, a connector 35 may also start, through which the operation of the motor M rotating the filter discs 14 and possibly the operation of other devices, such as the magnetic valve 21 of the cleaning-water pipe 22, are controlled. Warm cleaning water can be passed into the suspension basin 12 through the pipe 22. The devices controlled via the connector 35 of the control unit 33 may also include the water supply means, by means of which, through a distributor piece 16 and pipes 15, the recirculation of the cleaning water is passed through the faces of the filter plates 14a towards the basin 12.

In its details, the cleaning method in accordance with the invention is accomplished, e.g., as follows. The suspension basin 12 is emptied of the suspension to be filtered, and clean, warm water is passed into the suspension basin 12 through the pipe 22 and the magnetic valve 21. When the basin 12 is appropriately filled with cleaning water, to which washing agents, such as hydrochloric acid, are added if necessary, the motor M is started to rotate the shaft 13. At the same time, the recirculation of cleaning liquid, taking place through the filter plates 14a, can be started. The ultrasonic generator 32 is started by means of the control unit 33, and a sufficiently intensive field of ultrasonic oscillation is applied to the ceramic plates 14a or equivalent on the revolving filter discs 14 by means of the detectors 30.

In ultrasonic cleaning, the cleaning water present in the basin 12 acts as the connecting liquid for the ultrasonic field, which water spreads the field of oscillation efficiently to the filter plates 14a while they revolve at the same time, so that the cleaning effect can be spread uniformly over all the plates 14a on the discs 14.

Owing to a sufficiently intensive ultrasonic field, cavitation and implosion are produced in the cleaning liquid present in the basin 12, which produce an efficient deep-cleaning effect on the faces of the filter plates 14a to be cleaned. Cavitation depends on surface tension. If necessary, the cavitation is increased by raising the temperature of the water present in the basin and/or by using washing agents.

The frequency of the ultrasonic energy supplied through the conductor 31 is, as a rule, of an order of 15 to 300 kHz. The detectors 30, which are preferably placed symmetrically at both sides of the vertical centre plane of the basin, are, e.g., magnetostrictive, piezoelectric or equivalent oscillators, which are arranged to operate, e.g., at or near the resonance frequency.

In preliminary tests, it has been noticed that a suitable power of ultrasonic electricity is about 100 to 500 W/m$^2$, preferably about 200 to 300 W/m$^2$, i.e. said power is given per unit of area of the filter plates 14a to be cleaned. It has been noticed that a suitable cleaning time, e.g., with suction dryers 10 that dewater dressed metal ores, is about 1 hour once in a week, so that the amount of ultrasonic energy to be used at one cleaning is of an order of about 0.1 to 0.5 kWh/m$^2$.

In plants in which there are several suction dryers of the sort shown in FIGS. 1 and 2, or equivalent, the ultrasonic generator 32 may be arranged so as to be displaceable and the ultrasonic detectors 30 mounted permanently on the bottom of the basins 12 of the suction dryers 10. In such case, the cleaning with ultrasonic intensification is carried out so that the ultrasonic generator 32 is brought to the suction dryer 10 to be cleaned and the plug of the conductor 31 is inserted into a socket (not shown), and the cleaning is carried out either by means of the control unit 33 or by manual control.

In plants in which there is quite a large number of suction dryers 10 and/or in which cleaning is required at relatively short intervals, ultrasonic cleaning can be arranged automatically, e.g., so that one ultrasonic generator 32 is connected by the intermediate of a multiplexor (not shown) alternating with the various suction dryers 10 to be cleaned, in which devices the other necessary operations, such as supply of washing water into the suspension basin 12 and recirculation of the cleaning water back through the filer plates 14a, take place by means of the control unit 33 by automatic control or, by manual control.

It is to be understood that variations and modifications of the invention can be made without departing from the spirit or scope thereof.

We claim:

1. A method for cleaning a suction dryer, wherein a suspension of particulate material in a basin (12) of the suction dryer (10) is dried by suction of the suspension through rotating porous ceramic filter discs (14) onto which filtrate cakes are formed and removed from the filter discs, and wherein said filter discs are cleaned so as to maintain the porous structure thereof, said cleaning method comprising draining the suspension from the basin, filling the basin with a cleaning liquid, passing ultrasonic frequency through the cleaning liquid filling the basin (12) while the ceramic filter discs (14) are rotated, thereby intensifying ultrasonic vibration and thus maintaining the porous structure of the filter discs.

2. Method according to claim 1 wherein the cleaning liquid is passed through the filter discs in a direction opposite to the circulation of the suspension to be filtered.

3. Method according to claim 1 wherein electric power used for the ultrasonic frequency is on the order to 15–300 kHz.

4. Method according to claim 1 wherein the ultrasonic frequency is effected by ultrasonic electric power in the range of 100 to 500 W/m$^2$ per m$^2$ of the filter discs.

5. Method according to claim 4 wherein the electric power is in the range of 200–300 W/m$^2$.

6. Method according to claim 1 wherein said cleaning liquid is water.

7. Method according to claim 6 wherein the water is heated prior to introduction into the basin.

8. Method according to claim 6 wherein a washing agent is added to the water.

9. Method according to claim 8 wherein the washing agent is hydrochloric acid.

10. Method according to claim 1 wherein magnetostrictive or piezo-electric oscillators are used to provide the ultrasonic frequency.

11. Method according to claim 10 wherein said magnetostrictive or piezo-electric oscillators are located at the bottom of basin (12).

* * * * *